United States Patent
Nilsson

(10) Patent No.: US 6,771,990 B1
(45) Date of Patent: Aug. 3, 2004

(54) METHOD AND A CELLULAR TELECOMMUNICATION APPARATUS FOR DISPLAYING THE LOCAL TIME

(75) Inventor: Soren Fogsgaard Nilsson, Frederiksberg (DK)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/506,583

(22) Filed: Feb. 18, 2000

(30) Foreign Application Priority Data

Feb. 22, 1999 (GB) .............................. 9903936

(51) Int. Cl.$^7$ .............................................. H04M 1/00
(52) U.S. Cl. ................. 455/566; 455/432.2; 455/550.1; 455/422.1; 368/47; 368/353; 342/457; 342/386
(58) Field of Search ................................ 455/566, 550, 455/466, 422.1, 432.2; 368/21, 10, 47, 353, 22, 67, 84; 342/457, 463, 464, 386 455

(56) References Cited

U.S. PATENT DOCUMENTS

| | | | |
|---|---|---|---|
| 5,375,104 A | | 12/1994 | Ishii et al. |
| 5,826,267 A | | 10/1998 | McMillan |
| 5,915,225 A | * | 6/1999 | Mills .......................... 455/558 |
| 5,915,255 A | | 6/1999 | Schwartz et al. |
| 5,920,824 A | * | 7/1999 | Beatty et al. ................ 455/550 |
| 5,969,678 A | * | 10/1999 | Stewart ....................... 342/457 |
| 6,081,299 A | * | 6/2000 | Kesselring ................... 348/512 |
| 6,192,007 B1 | * | 2/2001 | Aoshima ...................... 368/10 |
| 6,198,696 B1 | * | 3/2001 | Korpi et al. ................... 368/21 |
| 6,282,431 B1 | * | 8/2001 | Konno ......................... 455/550 |
| 6,317,609 B1 | * | 11/2001 | Alperovich et al. ......... 455/556 |
| 6,393,263 B1 | * | 5/2002 | Hayashi ....................... 455/145 |
| 6,529,717 B1 | * | 3/2003 | Blants et al. ............. 455/186.1 |

FOREIGN PATENT DOCUMENTS

| | | | |
|---|---|---|---|
| DE | 24 21 439 | * | 5/1974 |
| DE | 24 21 439 A1 | | 11/1975 |
| EP | 0475298 A1 | | 9/1991 |
| EP | 0565927 A1 | | 3/1993 |
| EP | 0731621 A2 | | 2/1996 |
| EP | 0 818 720 A1 | | 1/1998 |
| WO | WO 97/10684 A1 | | 3/1997 |
| WO | WO 97/41654 A1 | | 11/1997 |

OTHER PUBLICATIONS

Abstract for JP 59064939, Koichi, "Mobile Radio System", Apr. 13, 1984, from Patent Abstracts of Japan, vol. 008, No. 167 (E–258).

* cited by examiner

Primary Examiner—William Trost
Assistant Examiner—Danh Le
(74) Attorney, Agent, or Firm—Antonelli, Terry, Stout & Kraus, LLP

(57) ABSTRACT

A method and cellular telecommunication apparatus for displaying the local time. The apparatus is provided with an internal clock, which indicates time in at least hours and minutes. The apparatus is also provided with display means for displaying time, and control means for calculating the local time based on information about local time data. Upon activation of the apparatus, it establishes a wireless connection to a cellular network, wherein the time is displayed on the display means. The apparatus sends a request to the network, which comprises a question about local time data. In response to the request, the network sends a response back to the apparatus. The response comprises information about local time data. The control means calculates the time difference between the internal clock and the local time data, and changes the indication of hours in the display means based on the time difference.

6 Claims, 2 Drawing Sheets

METHOD AND A CELLULAR TELECOMMUNICATION APPARATUS FOR DISPLAYING THE LOCAL TIME

BACKGROUND OF THE INVENTION

The present invention relates to a method and to a cellular telecommunication apparatus for displaying the local time.

Cellular phones are frequently used today, and one common feature is the internal watch/clock which enables the user to monitor the present time. The watch/clock is hereafter referred to as clock. The internal clock is often very accurate, which makes this feature very useful. However, when travelling between different time zones, the clock must be changed every time the phone is entering another time zone, in order to display the correct time in the present time zone. This means that the user must set a new time in the clock, if he/she would like to monitor the actual time. If the user is travelling between different time zones, it might become very annoying if you forget to set the clock in accordance with the actual time difference. Therefore, it is desirable for a phone, which is able to display the time, to be automatically adjusted to the standard time where its used.

U.S. Pat. No. 5,375,104 discloses a mobile terminal equipment, which is able to display the local time within geographical areas having different time zones. The equipment uses an IC-card to store time differences between a standard time zone and a main area. When the user enters a new time zone, the equipment receives locational information, which is stored in a ROM memory. Thereafter, the equipment should be able to locate the standard time zone on the IC-card, calculate the time difference, and display the result on the equipment. However, this means that when using the IC-card, it is required to establish some kind of database on the IC-card, and have a routine to handle the data when calculating the actual time for each geographical area having a different time zone than the main area. Also, the time differences are stored on the IC-card, which take up valuable space in the memory. For example, an IC-card in a GSM telephone could be equal to the SIM (subscriber identity module) card, which is used in this type of telephones, and has a very restricted amount of memory. Thus, it is desirable to avoid using, or at least save valuable memory space on such cards. Also, it is desirable to simplify the calculation of the local time.

WO 90/13983 discloses a portable receiver, e.g. a pager, which has a time of day clock. The portable receiver receives a signal indicative of the location of the receiver, which determines the time zone of the location and the time zone of the time of day clock. The time of day clock is adjusted to correspond to the time zone of location. However, as described in U.S. Pat. No. 5,375,104, this requires that the pager has a memory provided with information of different time zones, which is a disadvantage when handling the received data.

EP-B1-0,475,298 discloses a further example of adjusting a clock in a cellular phone, by means of a memory provided with information of different time zones.

GB-A-2,284,965 mentions that it is possible to receive time data from a base station, which allows the telephone to recalibrate its own time in accordance with the reference time data of that base station.

SUMMARY OF THE INVENTION

The main object of the present invention is to provide a phone, which is able to display the time, to be automatically adjusted to the standard time of its use. Another object is to avoid using valuable memory space in the phone or a card to be inserted in the phone. Also, it is an object to simplify the calculation of the local time.

These objects are achieved in accordance with the present invention by claims 1, and 6, respectively.

One particular advantage of the invention is that the clock in the phone does not have to be recalibrated, since the only change which will occur on the display is the indication of hours. The clock in the phone is mostly very accurate. This means that, if the clock is recalibrated, the time indicated on the display may differ from original clock settings. Thus, this is a very good feature, when the user is comfortable with the clock settings, and is only interested to change the hours of the indicated time, the user does not have to be worried about any changes of the time which is beyond the user's knowledge.

Further advantages of the present invention will be apparent from the dependent claims.

BRIEF DESCRIPTION OF THE DRAWING

The invention will be described in greater detail in the following by way of example only and with reference to the attached drawings, in which FIG. 1 schematically illustrates a preferred embodiment of a hand portable phone according to the present invention, FIG. 2 schematically shows the essential parts of a telephone for communicating with a cellular or cordless network.

DETAILED DESCRIPTION OF EMBODIMENTS

Figure 1:
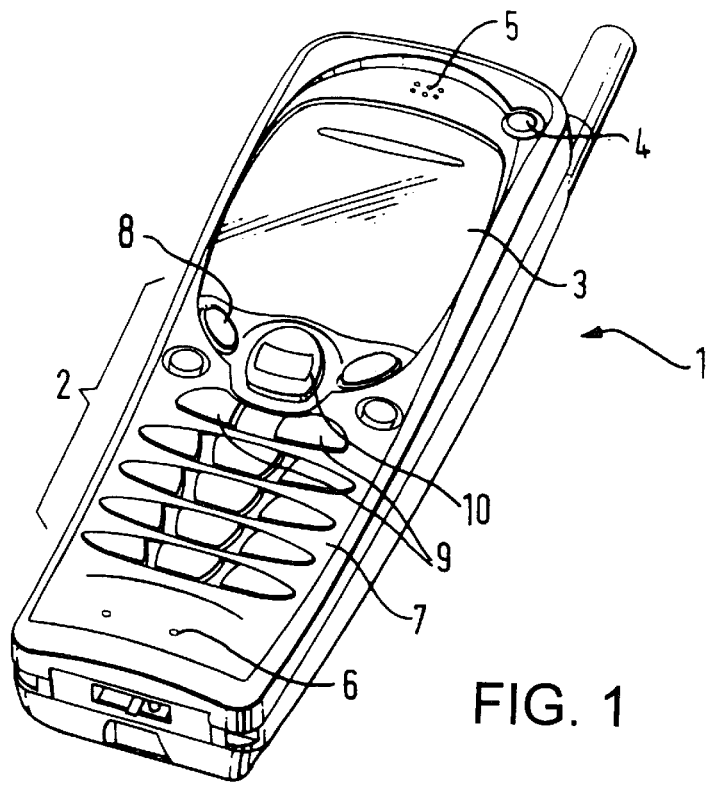

FIG. 1 shows a preferred embodiment of a cellular communication apparatus, hereafter also referred as a phone, according to the present invention. The phone, which is generally designated by 1, comprises a user interface having a keypad 2, a display 3, an on/off button 4, a speaker 5, and a microphone 6. The phone 1 according to the preferred embodiment is adapted for communication via a wireless telecommunication network, e.g. a cellular network. However, the phone could also have been designed for a cordless network. The keypad 2 has a first group 7 of keys as alphanumeric keys, by means of which the user can enter a telephone number, write a text message (SMS), write a name (associated with the phone number), etc. Each of the twelve alphanumeric keys 7 is provided with a figure "0–9" or a sign "#" or "*", respectively. In alpha mode each key is associated with a number of letters and special signs used in text editing. The keypad 2 additionally comprises two soft keys 8, two call handling keys 9, and a navigation key 10.

The two soft keys 8 have a functionality corresponding to what is known from the phones Nokia 2110™, Nokia 8110™ and Nokia 3810™. The functionality of the soft key depends on the state of the phone and the navigation in the menu by using a navigation key. The present functionality of the soft keys 8 is shown in separate fields in the display 3 just above the keys 8.

The two call handling keys 9 according to the preferred embodiment are used for establishing a call or a conference call, terminating a call or rejecting an incoming call.

The navigation key 10 is an up/down key and is placed centrally on the front surface of the phone between the display 3 and the group of alphanumeric keys 7. Hereby the user will be able to control this key by simply pressing the up/down key using his/her thumb. Since many experienced phone users are used to one-hand control, it is a very good solution to place an input key, requiring precise motor movements. Thus, the user may place the phone in the hand between the finger tips and the palm of the hand. Hereby, the thumb is free for inputting information.

Figure 2:
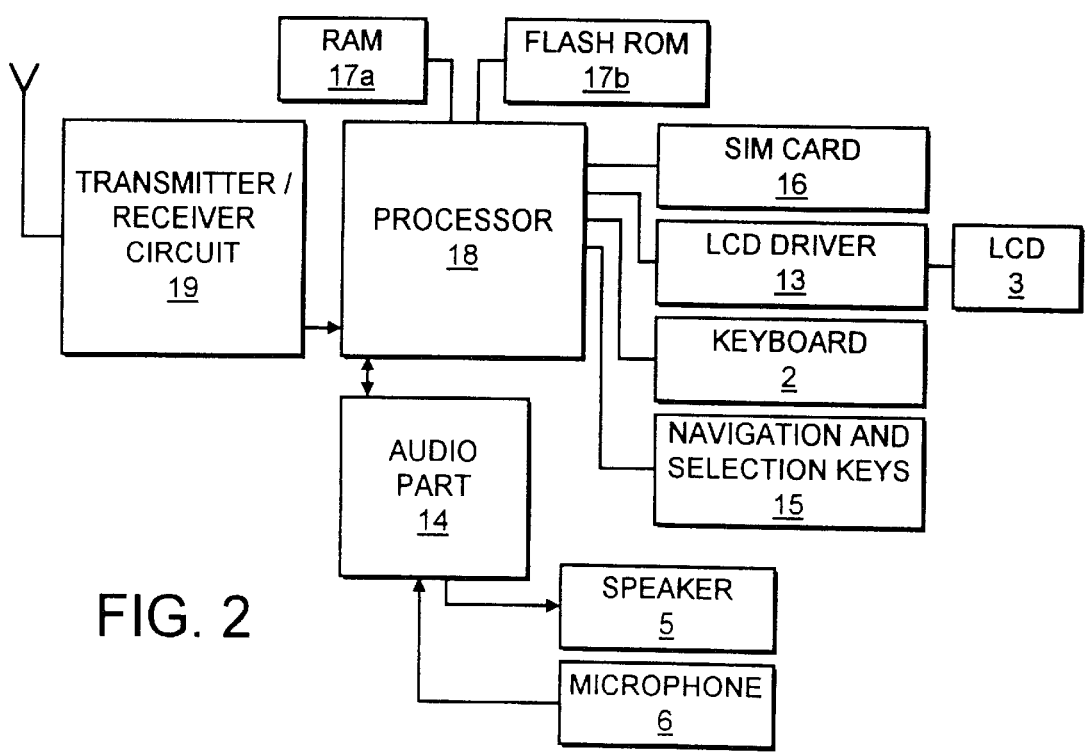

FIG. 2 schematically shows the most essential parts of a preferred embodiment of the phone. These parts being essential to understand the invention. The preferred embodiment of the phone of the invention is adapted for use in connection with a GSM network, but, of course, the invention may also be applied in connection with other phone networks, such as other kinds of cellular networks and various forms of cordless phone systems or in dual band phones accessing sets of these systems/networks. The microphone 6 records the user's speech, and the analogue signals formed thereby are A/D converted in an A/D converter (not shown) before the speech is encoded in an audio part 14. The encoded speech signal is transferred to controller means 18. The controller means 18 comprises a processor, which may support software in the phone. The controller means 18 also forms the interface to the peripheral units of the apparatus, wherein the peripheral units can comprise a RAM memory 17a and a Flash ROM memory 17b, a SIM card 16, the display 3 and the keypad 2 (as well as data, power supply, etc.). The controller means 18 communicates with a transmitter/receiver means 19, e.g. a circuit which is adopted to send/receive a request/respond to/from a telecommunication network. The audio part 14 speech-decodes the signal, which is transferred from the controller 18 to the earpiece 5 via a D/A converter (not shown).

The controller means 18 is connected to the user interface. Thus, it is the controller means 18 which monitors the activity in the phone and controls the display 3 in response thereto.

Therefore, it is the controller means 18 which detects the occurrence of a state change event and changes the state of the phone and thus the display text. A state change event may be caused by the user when he activates the keypad including the navigation key 10, and these type of events are called entry events or user events. However, the network communicating with the phone may also cause a state change event. This type of event and other events beyond the user's control are called non user events. Non user events comprise status change during call set-up, change in battery voltage, change in antenna conditions, message on reception of SMS, etc.

Display

Figure 3:
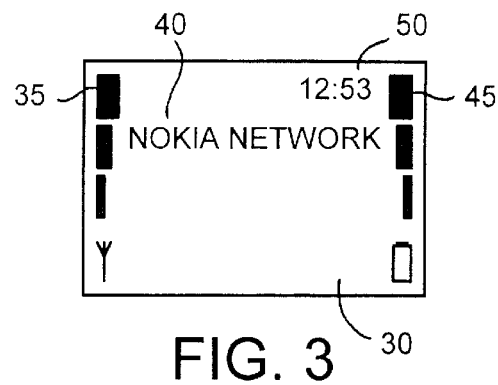
FIG. 3 shows an example of a display in a phone according to the present invention.

FIG. 3 shows an example of a display 30 in a phone, as shown in FIGS. 1 and 2, which indicates signal strength 35 from the wireless telecommunication network "NOKIA NETWORK" 40, the battery power 45 and a clock showing the time 50 in hours and minutes. Naturally, the time can be displayed in another format, e.g. hours, minutes and seconds, or displayed only in hours, minutes, or seconds. Preferably, the display means in the phone is an LCD (Liquid Crystal Display) display. The clock, which indicates the time, can be controlled by the control means 18 as shown in FIG. 2

Calculation of Time Difference

Figure 4:
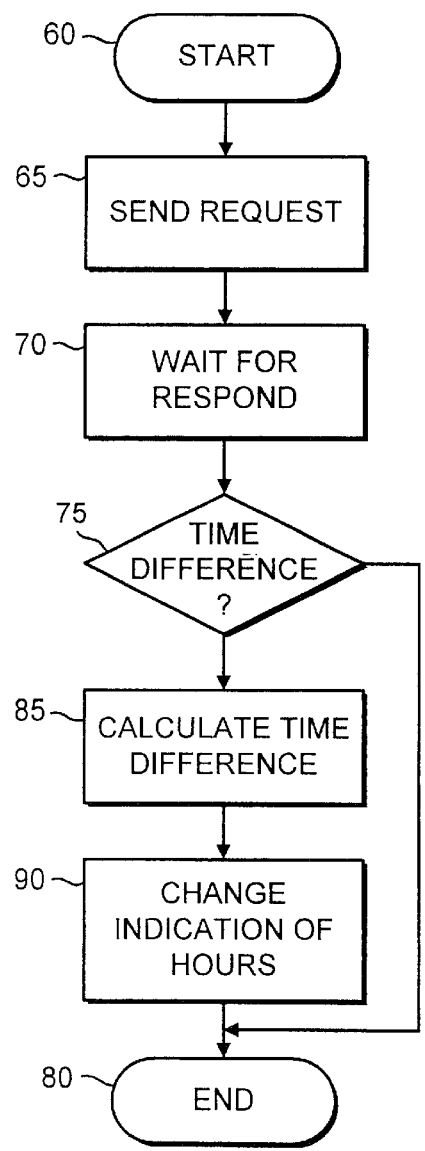
FIG. 4 shows a flowchart of calculating the time difference when entering a new time zone, in accordance with the present invention.

FIG. 4 shows a flow chart, in accordance with the present invention, describing the calculation of the time difference in a cellular telecommunication apparatus, when a user is entering a new time zone. The cellular telecommunication apparatus in this example is of the same type as described in FIGS. 1 and 2, and the apparatus is hereafter also referred to as a phone. The phone is provided with an internal clock, indicating time in at least hours and minutes. The indication of the time is displayed on display means 30, as shown in FIG. 3. Also, it is the control means 18 in FIG. 2 which calculates the local time based on information about local time data.

When the phone is activated and establishes, a wireless connection to a cellular network, e.g. when the phone roams to a new network, "START" 60, the local time data is received from the network. It should also possible to receive this kind of data when the phone is running a location update in a GSM network, i.e. the phone is already connected to a network. The time data is provided in one of a number of base stations, which is provided by each network operator. The local time data can be sent in form of an SMS (Short Message Service). The format of the local time data is an information element having a length of 8 octets, and may comprise information about the time zone, year, month, day, hour, minute and second. This format is implemented as a standard in the GSM specification (GSM 04.08 version 5.6.2., September 1997, chapter 10.5.3.8 on pages 388–389). Since the local time data is implemented as a GSM standard, it will not be necessary to describe this any further.

Thus, when the phone sends a request to the present network, "SEND REQUEST" 65, it will wait for a respond from the network, "WAIT FOR RESPOND" 70, and finally receive local time data. Naturally, if the phone does not receive any data, it should be possible to set a time out, in order to avoid an endless loop of waiting. When the data is received, it will be compared with the time set in the internal clock provided in the phone, "TIME DIFFERENCE" 75. If there is no time difference, the procedure is finished, "END" 80. Else, the control means calculates the time difference between the internal clock and the received local time data, "CALCULATE TIME DIFFERENCE" 85.

The calculation can be done in different ways. For example, the control means can simply replace the hours on the display by the received time data, and/or the received time data is subtracted from the internal clock. In case of a subtraction, which results in several decimals, the control means can truncate the hours in the result of the calculated time difference, and adds/subtracts the truncated hours to/from the hours indicated in the internal clock.

Finally, the control means changes the indication of hours on the display, based on the time difference, "CHANGE INDICATION OF HOURS" 90, and the procedure is completed, "END" 80.

The invention is not limited to the above described and in the drawings shown examples of an embodiment but can be varied within the scope of the appended claims. For example, it is also possible to change the date in the same manner as described above, e.g. by replacing a date shown on the display by the received time data. This could be a useful feature if the user enters another time zone, where a change of date has taken place in that present time zone, and a change of date has not taken place in the user's time zone at home.

What is claimed is:

1. Method for displaying the local time in a cellular telecommunication apparatus being provided with an internal clock, indicating time in at least hours and minutes, display means for displaying time, and control means for calculating the local time, and upon activation of said apparatus, said apparatus has established a wire less connection to a cellular network, where in the time is displayed on said display means, characterized in that said apparatus sends a request to said network, said request comprises a question for time information including local time data, the network sends a response to said request which is received by said apparatus, said response comprises time information including local time data, and said control means calculates the time difference between the internal clock and the local time data, and changes the indication of hours in the display means based on said time difference.

2. A method according to claim 1, characterized in that said control means truncates the hours in the result of the calculated time difference, and adds/subtracts the truncated hours to/from the hours indicated in the internal clock.

3. A method according to claim 1, characterized in that said clock further indicates the date on the display means, and that the control means replaces the date shown on the display by the received time data.

4. A method according to claim 1, characterized in that the apparatus uses a short messaging service (SMS) for sending/receiving said request.

5. A method according to claim 1, characterized in that said time information including the local time data is provided in the cellular network.

6. A cellular telecommunication apparatus comprising:

transceiver means, to send/receive a request/respond to/from a telecommunication network, an internal clock, to indicate time in at least hours and minutes, display means, to display time, and control means, to calculate the local time based on information about local time data, characterised in that said apparatus is arranged to send/receive a request/respond to/from said network, comprising a question/information about local time data, wherein said control means is further arranged to calculate the time difference, between the internal clock and the local time data, and to change the indication of hours in the display means based n said time difference.

\* \* \* \* \*